UNITED STATES PATENT OFFICE.

WILLIAM S. CORBY AND CHARLES I. CORBY, OF WASHINGTON, DISTRICT OF COLUMBIA.

ART OF MAKING DOUGH FOR BREAD.

SPECIFICATION forming part of Letters Patent No. 691,749, dated January 28, 1902.

Application filed June 6, 1899. Serial No. 719,589. (No specimens.)

*To all whom it may concern:*

Be it known that we, WILLIAM S. CORBY and CHARLES I. CORBY, citizens of the United States, residing at Washington, in the District of Columbia, have invented and discovered certain new and useful Improvements in the Art of Making Dough for Bread, of which the following is a specification.

Our invention relates to the art of making dough for fermented or leavened bread, particularly to such art as described and claimed in our Patent No. 629,239, dated July 18, 1899, according to which improvements the dough after the ingredients thereof have been mixed or commingled, so as to form a coherent and moist mass, is subjected to certain manipulations whereby it is drawn out and sheeted or shredded particle by particle, so as to effect a complete intermingling and blending of the ingredients of the dough.

In our Patent No. 639,889, of December 26, 1899, we describe in detail a specific form or manner of carrying out our process in which the agitation and manipulation of the dough from the first mingling of the ingredients to its perfect formation is carried on as a single uninterrupted process, and we therein set forth the advantages which are incident to such particular method of carrying out our invention.

We have discovered that the peculiar manipulation of the dough which we will presently describe more in detail and which is set forth in our Patents Nos. 629,239 and 639,889 may take place after the dough or a part thereof has been sufficiently mixed to form a moist dough mass and after this mass has been allowed to stand for a greater or less length of time, during which the yeast or other ferment employed acts upon the dough mass to lighten it, and that certain advantages are incident to this particular process or method of procedure.

The invention covered in this case may be employed in the making of sponge-doughs—that is, doughs in which a portion of the flour and of the liquid employed to moisten it and all or practically all of the yeast are mixed and then allowed to stand for a time to allow the yeast to develop, after which this dough mass or "sponge," as it is called, has added to it the other ingredients for the complete dough—or to the making of straight doughs—that is, doughs in which all of the ingredients are mixed together in the first instance.

In operating according to our process the ingredients of the sponge-dough or of the entire dough, according as a sponge or a straight dough is to be made, are placed together and mixed until a moist dough mass is formed. Such mixing may be accomplished in many ways, as by hand, by the use of an ordinary spiral-bladed mixing-machine, or by a mixing-machine employing a rotary beater. The dough mass thus made is then allowed to stand for a greater or less length of time, accordingly as circumstances may dictate, during which time it is more or less lightened or raised by the action of the gas developed through the growth of the yeast or by whatever other ferment may be employed. We usually prefer that the dough mass should be placed in a trough such as is ordinarily used in bake-shops, especially when a straight dough is being made, wherein it stands during this step of the process, though it might be allowed to remain in the same vessel in which it was first mixed. In the making of a straight dough according to our present process it may stand sufficiently long after the first mixing to become raised or lightened to such an extent as to require its being kneaded or worked over, which operation is usually performed by hand in the usual way. Indeed, the dough may stand so long as to be raised and kneaded over two or more times, if desired, as the length of time during which the dough stands after being first mixed and before its final treatment is largely a matter of indifference and in practice will be determined by the peculiar circumstances under which our process is being worked. The whole dough after thus standing and being subject to the action of the yeast for a greater or less length of time, or the sponge, with the ingredients necessary to complete the dough added thereto, is then subjected to a manipulation which operates to draw out or subdivide the dough rapidly and particle by particle into sheet-like or shred-like submasses or particles, which drawn-out and subdivided particles are recombined to be again drawn out and subdivided and these operations repeated again and again and with great rapidity.

In practice the dough is removed from the receptacle in which it was placed after being first mixed to a machine which we term a "beating-machine"—such, for instance, as is illustrated in our earlier patents, Nos. 639,889 and 640,096, dated December 26, 1899. Such a machine consists, preferably, of a vessel or receptacle in which is arranged a horizontal rotary shaft carrying a series of bars which act upon the dough. The beater is driven at a relatively high speed, so that in operation it has a centrifugal action upon the dough sufficient to cause it, largely or entirely, to leave the axis of the beater and to be engaged by the peripheral parts of the beater, which, acting upon it, tend to carry the dough forward with them or to throw it off tangentially, while the walls of the receptacle or vessel in which the beater operates tend to retard or hold back the dough from freely partaking of the movement of the beater and at the same time retain it within the field of action of the beater. The dough subject to such an operation, which draws it out, particle by particle, into sheets, membranes, and shreds rapidly and many times, acquires great tenacity and smoothness of texture and is thoroughly and completely aerated throughout its entire mass. The dough after being thus sufficiently worked is again allowed to stand and become light under the action of the yeast or other ferment and is kneaded over one or more times by hand, if found desirable, after which it may be molded and baked in the usual way.

In making dough according to the present process we employ a larger quantity of liquid—water or water and milk—than is usually employed when making doughs according to the methods heretofore commonly in use. The reason for this has been fully set forth in our aforesaid patents and is believed by us to be due to the very perfect union of the water with the ingredients of the dough, and particularly to the very complete hydration of the gluten or gluten-forming constituents of the flour which we are able to accomplish by our process.

We have discovered that if the dough or a portion thereof is first mixed and this dough mass is then allowed to stand for a time, so that the yeast can act therein to raise or lighten it, and subsequently to these operations the mass of dough be so manipulated or agitated as that it is thoroughly aerated and also perfectly blended or mixed, the yeast seems to have new vigor imparted to it, and the action of the dough after such manipulation is strikingly like that of a freshly-made dough.

The advantages incident to this process will be apparent to those skilled in the art of dough and bread making.

It sometimes happens, particularly in the warm season, that it is difficult or even impossible to mold and bake the bread as fast as it comes to the proper condition for such operations, with the result that the dough becomes sour and often spoils before it is gotten into the oven. By means of our process we make it possible to extend the time during which the dough may stand after being mixed and before being baked without deterioration or detriment. Thus in a shop where the baking capacity is small relative to the required output a portion of the dough might be treated according to the usual process now followed by most bakers, or, better, according to the process described in our aforesaid patents, and another portion of dough treated according to the process described in this case. The dough made according to the usual process or by our other process would first come to condition for baking, while that made according to the process herein described could stand a longer time before being molded and baked, so that the ovens would not be crowded, the baking period extending over a greater length of time.

The process herein described is particularly adapted to the making of sponge-doughs, where it is impracticable to complete the making of the dough at one mixing or manipulating operation.

We believe that the reasons for the results which are attained when following our process are as follows: The growth and development of the yeast while actively maintained tends to hold in check the development of other growths bacterial in their character, which if allowed to proceed beyond a certain stage deleteriously affect the dough, among other results causing it to become sour. After a time the growth of the yeast becomes less vigorous and active, and it is then that these other growths assume greater vigor of development and the dough begins to deteriorate. By so manipulating the dough as that atmospheric air is thoroughly worked through it after the dough has been allowed to stand and the yeast to grow therein to a certain extent the action of the oxygen of the air seems to impart new vigor and vitality to the yeast, and it acts with such renewed energy as to hold in check for a length of time longer than it otherwise would the growth and development of those organisms which are injurious to dough. The manipulation of the dough as we have described not only serves to supply the dough with air, as set forth, but it also tends to so blend and mix the ingredients as that the dough assumes the peculiar characteristics as to color, smoothness of texture, tenacity, &c., which are incident to our general process and as set forth in detail in our said patents.

We do not in this application claim, broadly, the process of manipulating dough in its manufacture, which consists in intermingling the constituents of the dough to form a coherent mass and after such mass has been formed rapidly drawing out or separating from the main dough mass portion after portion of such mass and again combining such portions with the main mass and continuing such operations until the said drawn-out portions assume sheet-like and shred-like forms of great tenacity and capable of being drawn into membranes, sheets, and shreds of extreme thinness; nor do we herein claim, broadly, the process which consists in completing the intermingling and combination of substantially all of the gluten of the flour with water prior to the breaking down or decomposition or other deleterious operations taking place in the dough and simultaneously disseminating the yeast or ferment, whereby there is effected a complete hydration of the gluten and glutinous constituents of the flour and a dissemination of the ferment, while the dough retains its desirable characteristics; nor do we herein claim the process of manipulating the dough as herein set forth, so as to effect a complete hydration of the gluten and simultaneously a dissemination of the yeast or ferment when these operations take place prior to the dough being allowed to stand and rise, as such subject-matter is claimed by us in our aforesaid patent, No. 629,239, preferring in this application to claim those features of invention which distinguish the process described in this case from that described in the patent last referred to.

We are aware of the process of bread-making as commonly carried out by the housewife in the manufacture of bread for family or domestic use, and we do not intend in this case to claim such process. In making bread according to the practice commonly followed in the household the dough after standing for a while and becoming light is kneaded over and is then either immediately divided into loaves, which are allowed to rise, or the entire mass is allowed to rise a second time before the molding into loaves takes place. Our process differs from such operation essentially in this: that the dough after being allowed to stand and becoming light is then thoroughly aerated—that is to say, is so manipulated that the atmosphere in which the manipulations take place is thoroughly worked through or caused to permeate practically every part of the dough mass. In our patents which have been hereinbefore referred to we attempted to point out the difference between the process of kneading, which is a manipulation in which the dough is maintained in mass condition, and the purpose is to keep it in that condition and work out therefrom the gas which it contains, principally carbonic-acid gas, and our peculiar process or method of manipulation, whereby it is intended to aerate the dough and intimately commingle its constituents by drawing the same out into sheets, membranes, shreds, and other forms, in order that as the particles or masses of dough thus produced are brought together there shall be abundant quantities of air confined between them and thus intimately and thoroughly worked through the entire dough mass. In the present process the novel step is an aeration or thorough permeation of the dough mass with a gas which will cause the yeast or ferment to act with new vigor. In the housewife or domestic process of dough-making the action of the yeast after the kneading of the dough as just referred to is usually hastened by setting the dough in a warmer atmosphere than that to which it was before subjected. This, however, is not an "invigorating" or "renewing" of the activity of the yeast in the sense that we employ these terms. It is merely a carrying forward of the action of the yeast already begun at a somewhat accelerated rate.

Having thus described our invention, what we claim, and desire to secure by Letters Patent, is—

1. In the art of making dough for fermented or leavened bread, the herein-described process, which consists in first mixing dough ingredients to form them into a moist dough mass, then allowing the mass to stand and be lightened by the action of the yeast or other ferment, and then drawing out, sheeting, and shredding the dough, substantially as set forth.

2. In the art of making dough for fermented or leavened bread, the herein-described process, which consists in making a sponge, permitting this to rise under the action of the ferment, then taking such sponge and the other ingredients to make the complete dough, and thoroughly mixing and aerating them, and drawing out, sheeting, and shredding the dough and then allowing this mass of dough to rise under the action of the ferment, substantially as set forth.

WILLIAM S. CORBY.
CHARLES I. CORBY.

Witnesses:
 J. S. BARKER,
 GEO. T. MAY, Jr.